Oct. 6, 1964 F. J. GROSS 3,152,075
TRASH RETAINER FOR MOVABLE TRASH RAKE
Filed June 29, 1960 4 Sheets-Sheet 2

Inventor
Frank J. Gross
By Robert B. Benson
Attorney

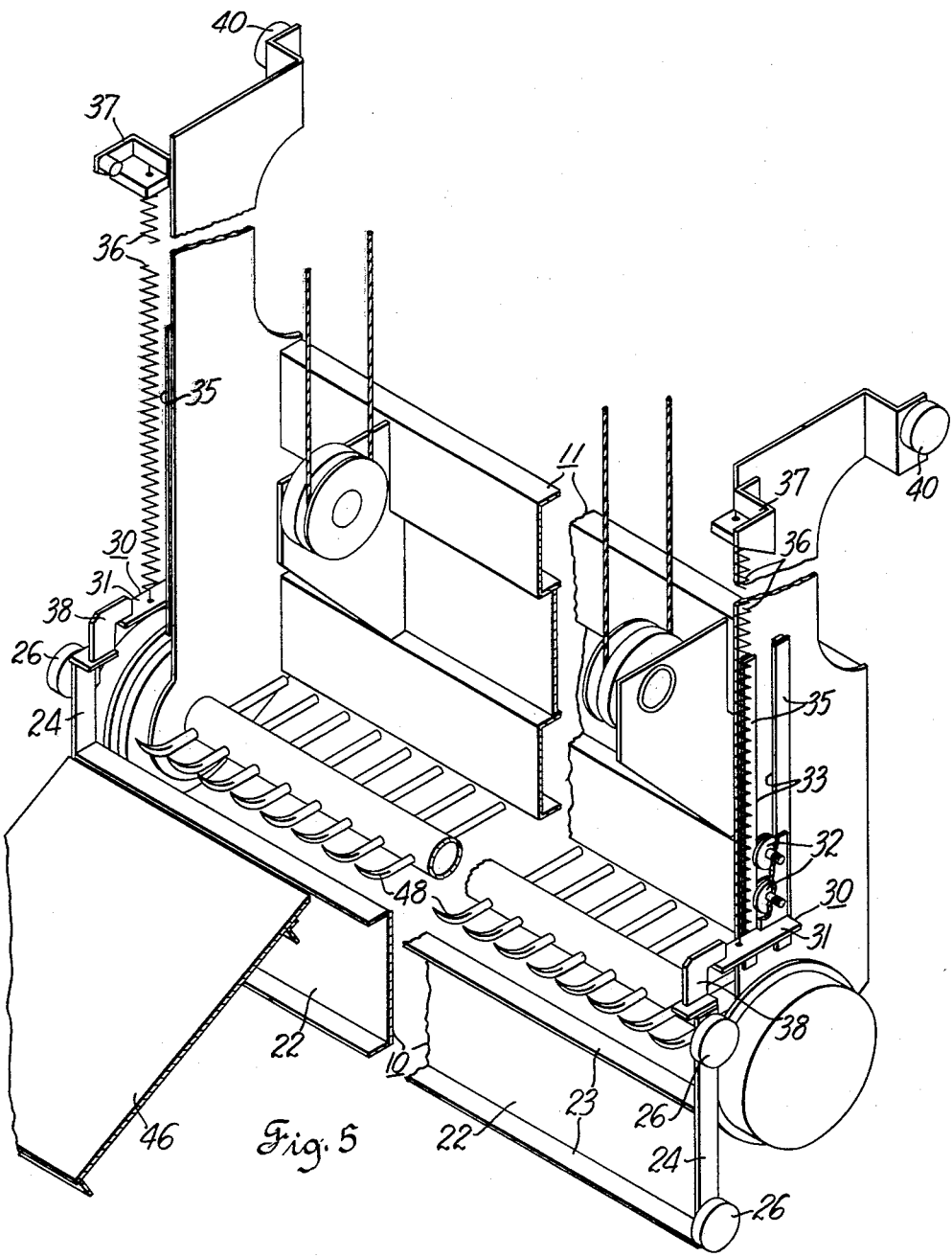

United States Patent Office 3,152,075
Patented Oct. 6, 1964

3,152,075
TRASH RETAINER FOR MOVABLE TRASH RAKE
Frank J. Gross, York, Pa., assignor to Allis-Chalmers
Manufacturing Company, Milwaukee, Wis.
Filed June 29, 1960, Ser. No. 39,665
2 Claims. (210—159)

This invention relates to a device for clearing the intake ends of a hydraulic installation, and more particularly to improvements in raking mechanisms used for cleaning intake racks or grills of a flume, millrace, sluiceway or the like.

Trash racks, as used in hydraulic installations, ordinarily function to check floating and submerged matter and thereby prevent debris from passing along with the hydraluic flow through a flume or millrace. Frequently a rack becomes so loaded with trash that the free passage of fluid is materially impeded and at such time a cleaning operation is necessary.

Intake trash racks, such as those mounted in the face of a dam, are often cleared by a toothed rake of the Leonard type which scrapes off the rack and collects trash as the rake is hoisted upward. Since the face of the dam and the rack bars define a plane which is either vertical or slightly inclined to be vertical, a flat surface is available to support the rake, so that as the rake is being hoisted, the rake teeth scrape along a surface which retains the trash on the rake. In other words, as the rake teeth scrape along the rack bars and above the rack, a surface must be provided to retain the trash on the teeth. This surface is normally provided by the rack and the face or apron of the dam in the area above the rack up to the disposal point.

However, some dams have been constructed with rack bars that end at a lower level than the disposal point and without an intervening face or apron. A problem then arises of preventing the trash from falling off the rake when the rake travels this intervening portion between the top of the rack bars and the disposal point.

This invention presents a solution to the above described problem. A retaining curtain is lowered to a position at the top of the rack bars. When the rake is hoisted up from the rack, it engages the awaiting curtain and lifts the curtain along to the disposal point. The rake and curtain cooperate to retain the trash on the rake while the rake travels between the top of the rack and the disposal point.

Therefore, it is an object of this invention to provide a new and improved trash raking mechanism.

Another object of this invention is to provide an improved means for preventing trash from falling off a trash rake.

Another object of this invention is to provide a novel trash retaining mechanism for a Leonard type trash rake that does not interfere with the normal raking operation.

Another object of this invention is to provide a new and improved trash raking structure that facilitates trash removal at the disposal point.

Other objects and a fuller understanding of the invention may be had by referring to the following description taken in conjunction with the accompanying drawing, in which:

FIG. 5 is an isometric view showing portions of the trash rake and retaining curtain in the trash disposal position.

Figure 1:
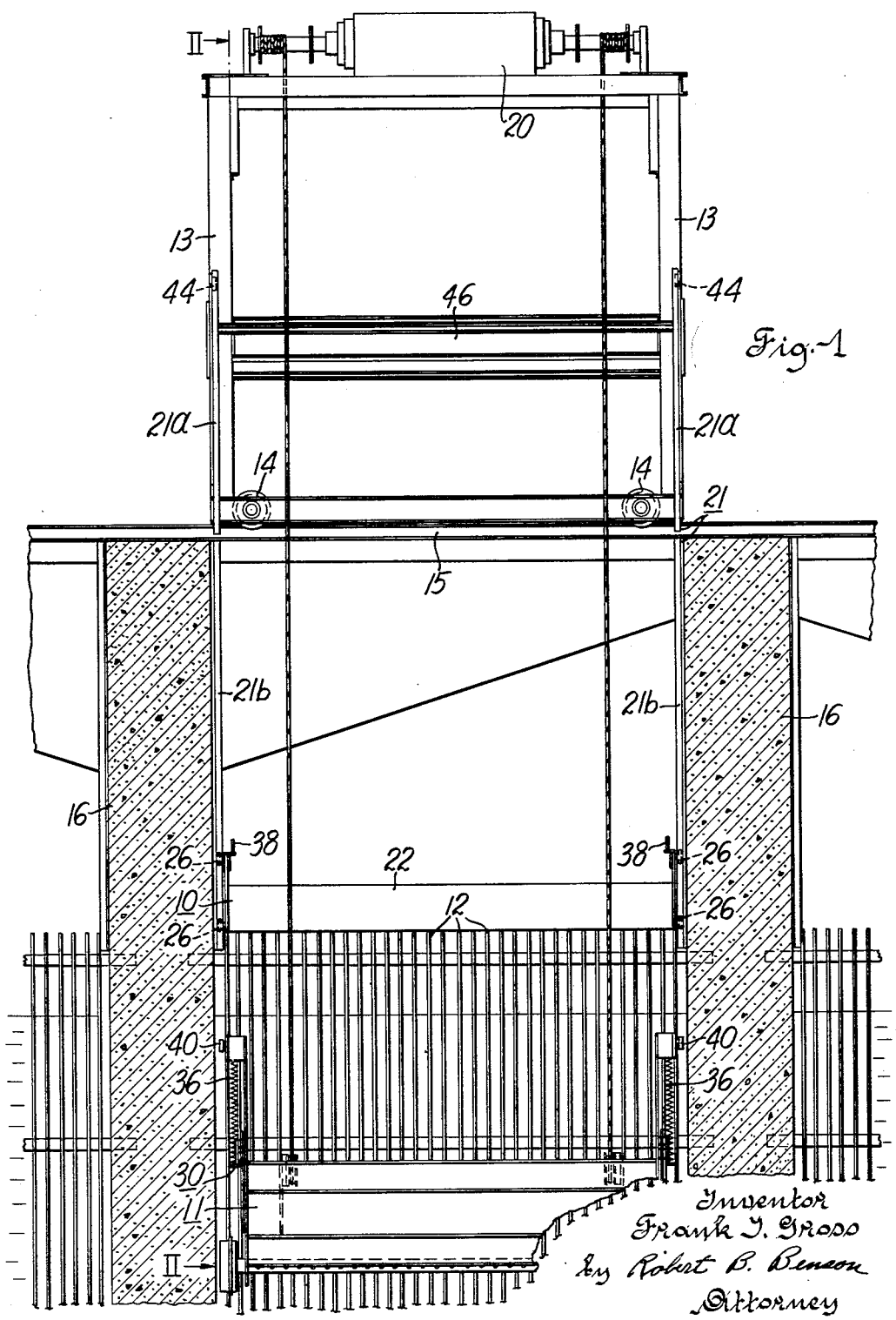
FIG. 1 is a front view of a portion of a hydraulic installation.
Figure 2:
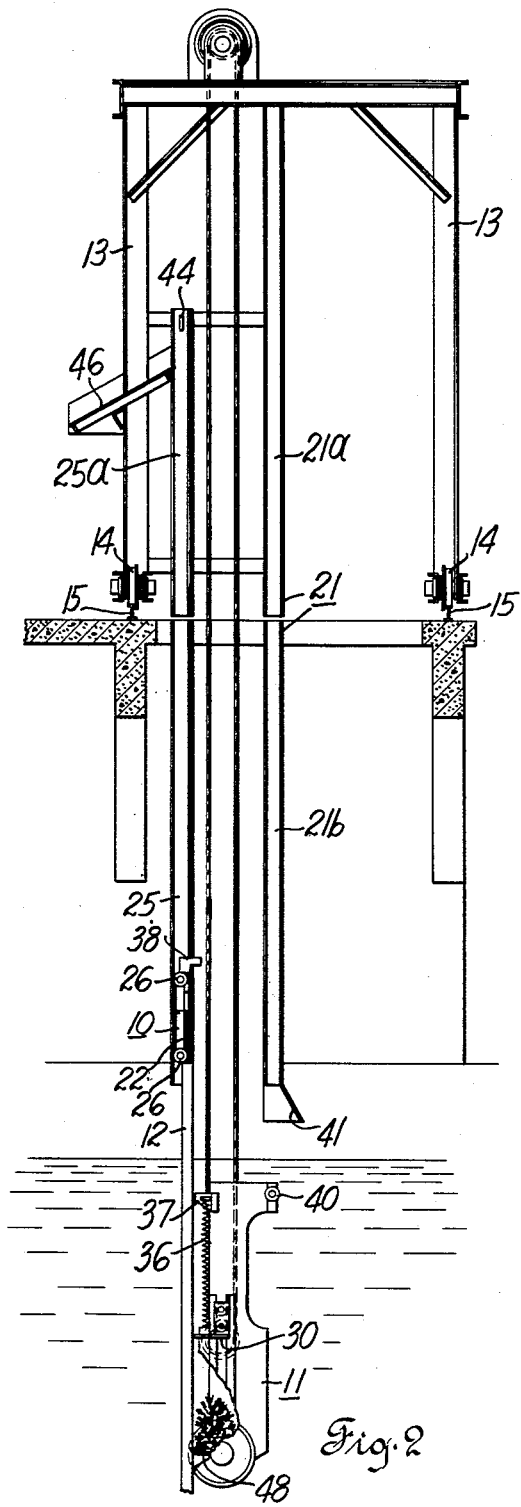
FIG. 2 is a sectional side view taken in the direction of line II—II of FIG. 1 showing a mobile trash raking mechanism positioned above an intake rack with the trash rake lowered for the cleaning operation.

The retaining curtain 10 of this invention is illustrated here in conjunction with a Leonard type trash rake 11 and a hydraulic dam of a type having an individual bay for each intake rack. As shown in FIG. 1 the intake rack comprises a series of vertically extending spaced bars 12 which separate the trash from the inflowing fluid by retaining the trash on the bars. As illustrated in FIGS. 1 and 2, the rake 11 is mounted on a mobile support frame 13 having wheels 14 which is in turn positioned on rails 15 extending across the top of the dam 16. In this manner, the entire raking mechanism can be moved along the rails to position it in the bay and above the particular rack to be cleaned.

A hoist means 20 is provided to lower and raise the trash rake 11 past the rack bars 12 to clean them. A first pair of channels or rails 21 are provided for guiding the rake 11 as it is lowered and raised. To facilitate transportation of the raking mechanism along the dam to different bays, the guide channels 21 may be severed and the upper portion 21a attached to the mobile support frame 13 and the lower portions 21b permanently attached to the sides of each individual bay as shown. Then, as illustrated in FIGS. 1 and 2, the top portions 21a of the first pair of guide channels 21 may be aligned directly over the lower portions 21b and thereby give the desired complete guide channels 21 extending downward from the frame 13 toward the rack bars 12. However, it is to be understood that this invention is not limited in application to only the individual bay type dam construction since it is obvious that modifications of this invention, for example, continuous guide rails, have use in other types of dam constructions.

The retaining curtain 10 can be of any suitable configuration, but as shown in the drawings, it has a flat side positionable against the rake 11 to provide a trash retaining surface 22. The curtain may be reinforced such as by the ribs 23 and 24. Furthermore, the vertical ribs 24 may be used for guiding the movement of the curtain. A second pair of channels 25 have been provided as shown to act as guides for the retaining curtain in cooperation with vertical ribs 24. In this case, wheels 26 are attached at each end of the vertical ribs 24 and are contained within the channels 25 thereby providing for vertical guidance of the curtain 10. The second pair of guide channels 25 may also be severed as shown in FIGS. 1 and 2, for the same reasons as mentioned above in connection with channels 21.

Engaging means 30 are provided for lowering of the retaining curtain with the trash rack as the trash rack descends for the raking operation and for lifting the retaining curtain with the rake as it ascends to the top of the dam for trash disposal.

As best shown in FIG. 5 the engaging means comprises a lifting plate 31 mounted on rollers 32 that are slidably positioned in a channel 33 formed between a pair of guides 35 mounted on the side of the trash rake 11. The lifting plate 31 is connected to the upper portion of the trash rake 11 by elastic means such as the coil spring 36 which has its upper end connected to a bracket 37 mounted on the trash rake and its lower end connected to the plate 31. The lifting plate is designed to engage a lug 38 connected to the top of the curtain 10. As shown in FIG. 5 the lug 38 is mounted on top of one of the vertical ribs 24.

Figure 3:
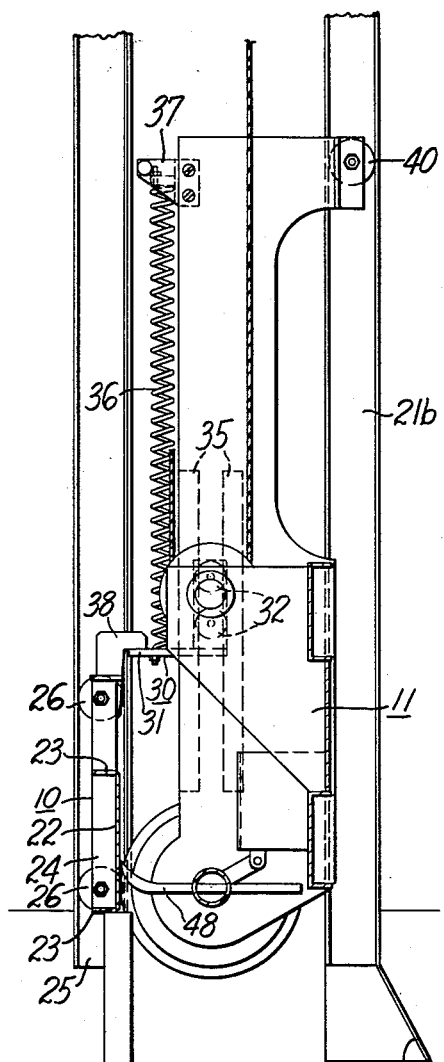
FIG. 3 is a side view of an enlarged portion of the trash rake of FIG. 2 shown at it leaves the rack bars and engages the awaiting retaining curtain.
Figure 4:
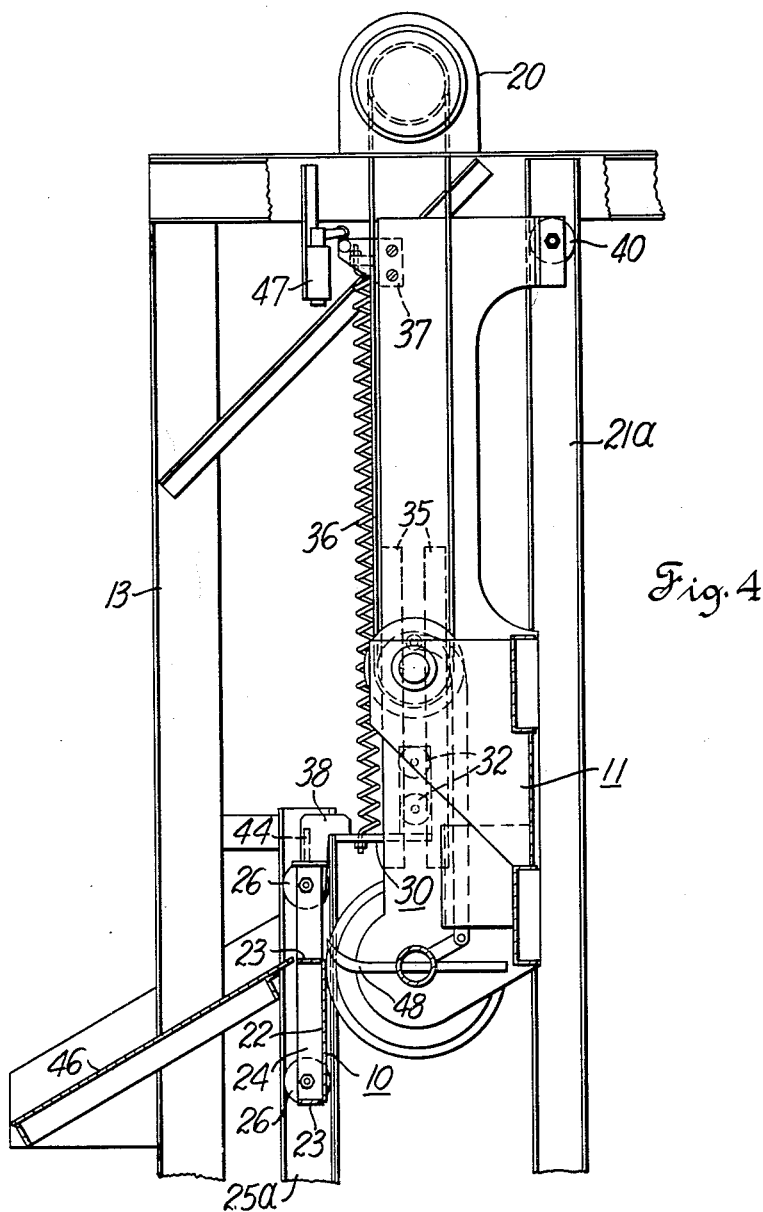
FIG. 4 is a side view of an enlarged portion of the trash rake of FIG. 2 showing the trash rake and retaining curtain positioned for trash disposal.

Rake guide wheels 40 are provided on the rake 11 and are positioned to fit into the first pair of guide channels 21 to guide the lifting plate 31 into engagement with the lugs 38 as shown in FIGS. 3, 4 and 5. Cams 41 are provided at the bottom of the guide channels 21b to aid in guiding the wheels 40 into the channels.

A first stop means is provided to engage the retaining curtain 10 as the trash rake 11 travels downward and hold it in a first position at the top of the intake rack bars 12; and a second stop means is provided to prevent movement of the retaining curtain 10 above a second or trash disposal position while the rake 11 continues upward. As shown in FIGS. 2 and 3, the tops of the rack bars 12 provide the first stop means for engaging the retaining curtain 10 thereby preventing any further downward motion. FIG. 4 shows a bar 44 attached to the guide channel 25a for preventing movement of the trash retaining curtain 10 above this position. Therefore, the curtain can only move vertically between the first position shown in FIGS. 1, 2 and 3 and the second or trash removal position shown in FIG. 4.

As the trash rake passes the first position on its upward journey, it engages the lug 38 and lifts the trash retaining curtain 10 along with it en route to the trash disposal position. As shown in FIG. 4 the curtain is stopped in a trash disposing position with its top even with the top of the disposing chute 46 when the lug 38 engages the bar 44. The trash rake continues upward extending the spring 36 until a bracket 37 contacts and trips the limit switch 47 thereby stopping motion of the trash rake. Then, as shown in FIGS. 4 and 5, the teeth 48 of the trash rake are above the top of the retaining curtain 10 and the top of the disposal chute 46.

In operation of the described raking mechanism, the mobile support frame 13 is moved along the rail 15 and positioned over a set of intake rack bars 12 so that the portions of the first and second pairs of guide channels 21 and 25 are aligned. As the trash rake 11 is lowered for the raking operation the retaining curtain 10 is lowered with the rake to the first position at the top of the rack bars 12. The engaging means then disengage allowing the trash rake 11 to continue downward to the bottom of the intake rack bars 12. The trash rake is then hoisted to collect trash from the bars 12. As the trash rake ascends, wheels 40 engage channel 21b to guide the lifting plate 31 of the trash rake 11 into engagement with the lugs 38 of the retaining curtain. As the rake continues upward beyond the first position, the rollers 32 of the lifting plate 31 roll in the channel 33 formed on the side of the rake by the guides 35. This continues until the coil springs 36 have extended to the point where the tension within equals the weight of the retaining curtain. Then any further upward movement of the rake will lift the retaining curtain. As they move upward together the retaining curtain provides a trash retaining face 22 in front of the rake teeth 48. Hence, trash is prevented from falling off the teeth because it is contained within a trash retaining basket formed by the retaining curtain 10, rake teeth 48, and the sides of the rake 11. When the top of the retaining curtain 10 reaches the top of the disposal chute 46 the rib 24 engages the bar 44 and further upward movement of the retaining curtain is blocked. However, the coil spring 28 can be extended further enabling the rake to continue upward. The trash rake continues upward until one of the brackets 37 trips the limit switch 47 and stops the trash rake. The rake teeth 48 are then above the trash retaining curtain 10 and the top of the trash disposal chute 46 and the trash remaining on the teeth may be easily raked off into the trash chute.

Although but a single embodiment of the present invention has been illustrated and described, it will be apparent to those skilled in the art that various changes and modifications may be made therein without departing from the spirit of the invention or from the scope of the appended claims.

Having now particularly described and ascertained the nature of my said invention and the manner in which it is to be performed, I declare that what I claim is:

1. A mechanism for cleaning a trash rack comprising: a trash disposal chute positioned above said rack; guide means positioned between said disposal chute and the upper end of said rack; a rake member for removing trash from said rack; means for selectively moving said rake member on both said rack and said guide means between the lower end of said rack and said disposal chute for trash disposal therein; a trash retaining curtain member mounted for movement only on said guide means; a stop associated with said guide means to prohibit upward movement of said curtain member beyond a position immediately beneath said disposal chute; elastic means connected to one of said members; and a lug connected to the other of said members for engagement with said elastic means, said rake and said curtain forming a trash retaining basket for coextensive movement from the upper end of said rack to said stop, said elastic connection permitting upward movement of said rake above said curtain after said curtain has engaged said stop to permit disposal of said trash in said chute.

2. A mechanism for cleaning a trash rack comprising: a support frame positioned above said rack; a trash disposal chute on said support frame; guide means attached to said frame and extending downward from said disposal chute to the upper end of said rack; a rake member for removing trash from said rack; means connecting said rake member to said frame for selectively raising and lowering said rake member relative to said rack, the movement of said rake being guided by both said rack and said guide means between the lower end of said rack and said disposal chute for trash disposal therein; a trash retaining curtain member connected to said guide means and movable thereon between said disposal chute and said rack; a first stop engageable with said curtain member to limit downward movement thereof beneath a position adjacent to the upper end of said rack; a second stop engageable with said curtain member to prohibit upward movement thereof above a position immediately beneath said disposal chute; elastic means connected to one of said members; and a lug connected to the other of said members for engagement with said elastic means to form a trash retaining basket between said rake and said curtain for coextensive movement from said first stop to said second stop, said elastic connection permitting upward movement of said rake above said curtain after said curtain has engaged said second stop to permit disposal of said trash in said chute.

References Cited in the file of this patent

UNITED STATES PATENTS

| | | |
|---|---|---|
| 1,984,891 | Miick et al. | Dec. 18, 1934 |
| 2,524,304 | Breda | Oct. 3, 1950 |
| 2,671,563 | Benner | Mar. 9, 1954 |
| 2,784,844 | Sturzenegger | Mar. 12, 1957 |

FOREIGN PATENTS

| | | |
|---|---|---|
| 1,007,509 | France | Feb. 6, 1952 |